Dec. 28, 1937.  C. C. HERSKIND  2,103,903

ELECTRIC VALVE CONVERTING SYSTEM

Filed March 20, 1937  3 Sheets-Sheet 1

Inventor:
Carl C. Herskind,
by Harry E. Dunham
His Attorney.

Dec. 28, 1937.                C. C. HERSKIND                2,103,903
                      ELECTRIC VALVE CONVERTING SYSTEM
                  Filed March 20, 1937          3 Sheets-Sheet 2

Inventor:
Carl C. Herskind,
by Harry E. Dunham
His Attorney.

Dec. 28, 1937.　　　　C. C. HERSKIND　　　　2,103,903
ELECTRIC VALVE CONVERTING SYSTEM
Filed March 20, 1937　　　3 Sheets-Sheet 3

Inventor:
Carl C. Herskind,
by Harry E. Dunham
His Attorney.

Patented Dec. 28, 1937

2,103,903

UNITED STATES PATENT OFFICE 2,103,903

ELECTRIC VALVE CONVERTING SYSTEM

Carl C. Herskind, Scotia, N. Y., assignor to General Electric Company, a corporation of New York Application March 20, 1937, Serial No. 132,153

8 Claims. (Cl. 171—97)

My invention relates to electric valve converting systems and more particularly to that type of system suitable for transferring energy between two constant potential direct current circuits.

It has heretofore been recognized that it is highly desirable in electric valve converting systems utilized for transferring energy between direct current circuits that the current impulses through the transformer and the valves be of substantially rectangular wave form. This rectangular wave form is obtained by breaking up the continuous current coming from the direct current supply into rectangular waves by means of a plurality of controlled electric discharge paths or valves functioning as an inverter system. It is highly desirable to maintain the flow of current from the direct current circuit to these valves substantially constant so as not to introduce a ripple into the direct current supply. It has been found that in order to provide the best possible operation, it is necessary to provide a source of commutating voltage for the electric discharge valves which operate as the inverter system, and also a source of magnetizing current for the main transformer so that the voltage appearing therein may be of substantially rectangular form.

It is, therefore, an object of my invention to provide an improved electric valve converting system for transferring energy between two constant potential direct current circuits which will overcome some of the disadvantages of the arrangements of the prior art, and which will be simple and reliable in operation.

It is a further object of my invention to provide an electric valve converting system of this type in which the source of commutating voltage for the inverter valves is a static means in which the apparatus has a high efficiency and which is economical to produce.

It is a still further object of my invention to provide an improved electric valve converting system of this type in which there is provided a static source of magnetizing current for the main transformer.

Figure 1:
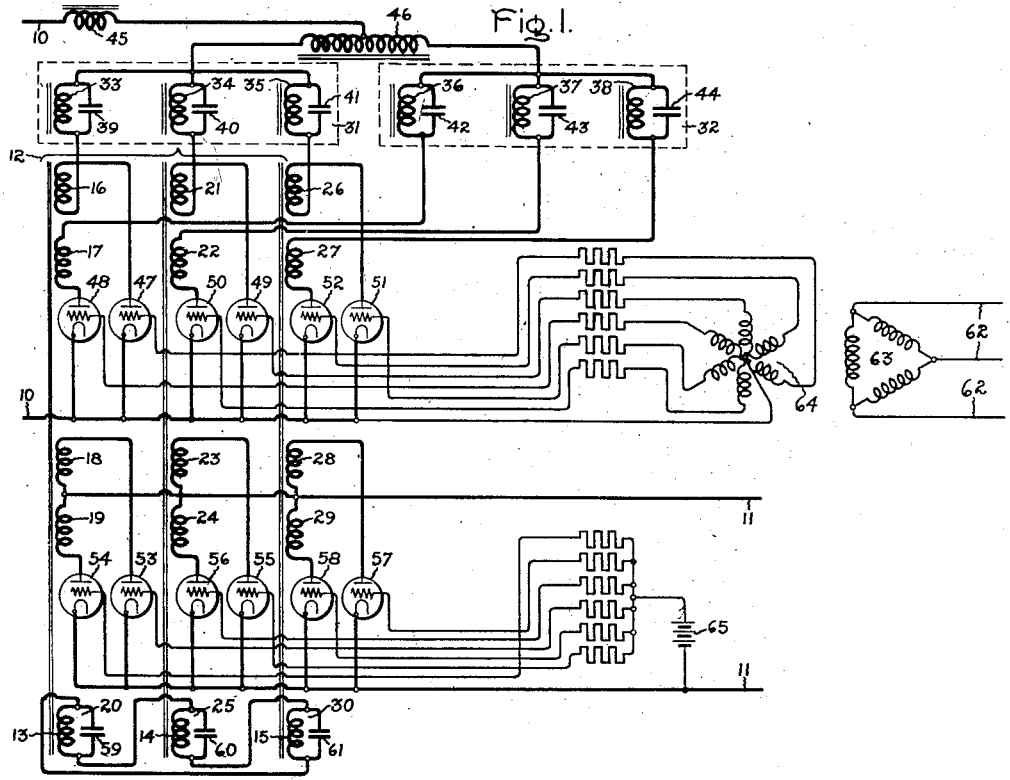
Figure 2:
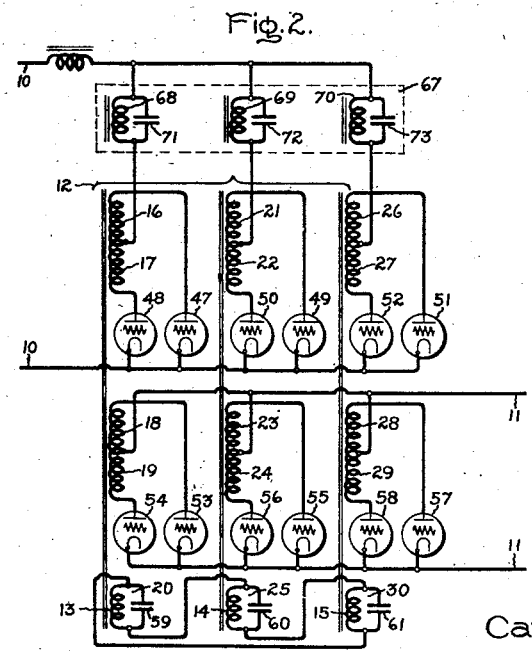
Figure 3:
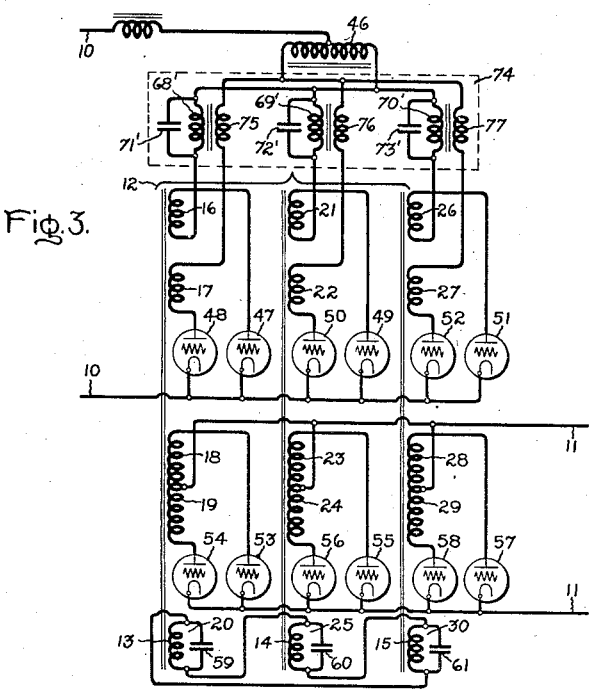
Figure 4:
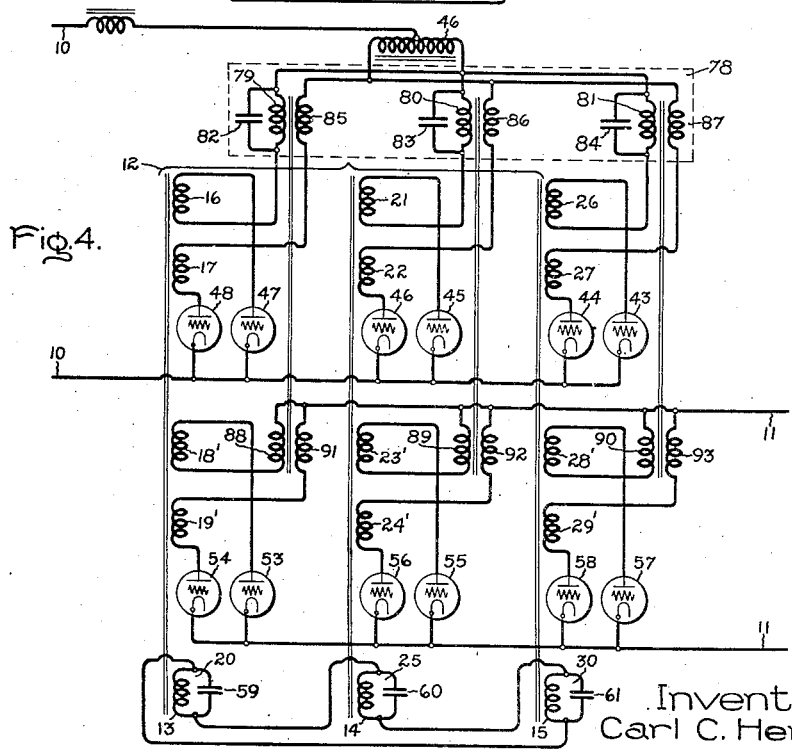
Figure 5:
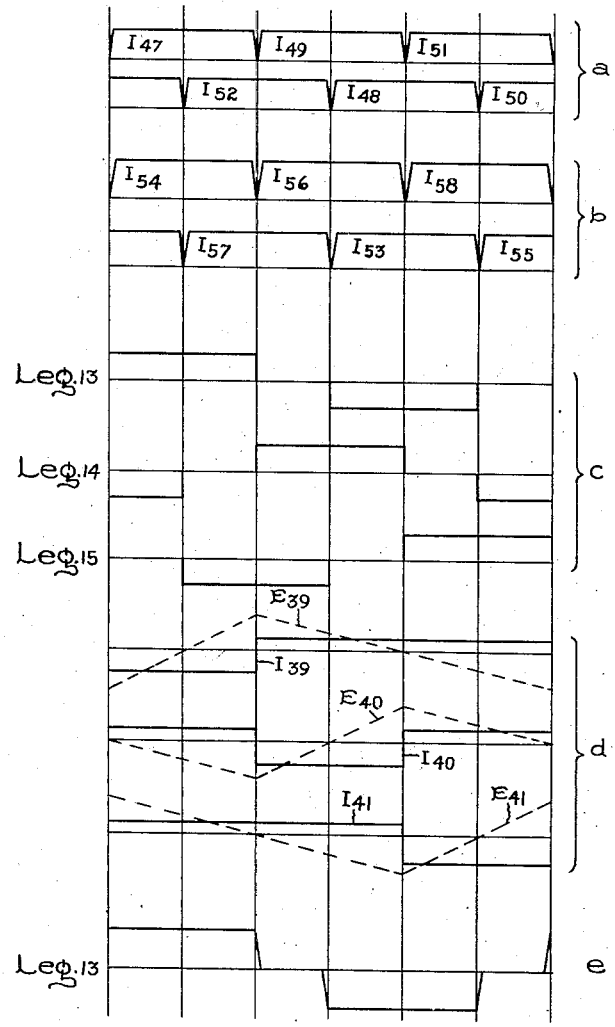

The novel features which I believe to be characteristic of my invention are set forth with particularity in the appended claims. The invention itself, however, both as to its organization and method of operation, together with further objects and advantages thereof, will be better understood by reference to the following description taken in connection with the accompanying drawings in which Fig. 1 represents a preferred embodiment of my invention; Figs. 2, 3 and 4 represent variations in my invention; Fig. 5 represents certain operating characteristics of my invention, and Fig. 6 shows the magnetic structure of the various transformers and magnetic core devices utilized in the system disclosed in Fig. 1.

Referring to Fig. 1 of the drawings, I have illustrated therein an electric valve converting system for transferring energy between the direct current circuit 10 and the direct current circuit 11, both of which have constant potential characteristics. This electric valve converting system utilizes a polyphase transformer 12 (denoted by the bracket embracing the three legs thereof) having a plurality of legs 13, 14 and 15. Each of the legs of the transformer is provided with two primary windings, two secondary windings and a tertiary winding. Thus the transformer leg 13 is provided with the primary windings 16, 17; the secondary windings 18, 19, and the tertiary winding 20. Similarly, the leg 14 is provided with primary windings 21, 22; secondary widings 23, 24, and a tertiary winding 25. The leg 15 of the transformer has two primary windings 26, 27; secondary windings 28, 29, and a tertiary winding 30. This electric valve converting system also includes two magnetic core structures 31 and 32, indicated by dotted lines, which have the same number of legs as the main transformer. Each leg of the magnetic core structures 31 and 32 is provided with an inductive winding 33, 34, 35, 36, 37 and 38 which are associated, respectively, with energy storage devices or capacitors 39, 40, 41, 42, 43 and 44 respectively. The corresponding terminals of each of the inductive windings of the magnetic core structure 31 are connected together and to the direct current circuit 10 though a reactor 45 and a portion of an interphase transformer or inductor 46. The corresponding terminals of each of the windings of the magnetic core structure 32 are connected together to the other portion of the interphase transformer 46 and the inductive reactor 45 to the same side of the direct current circuit 10. Each of the remaining terminals of the inductive windings of the magnetic core structures 31 and 32 is connected to a different one of the primary windings of the transformer 12. Each of the remaining terminals of the primary windings of the transformer 12 is connected through a controlled electric discharge path to the other side of the direct current circuit 10. Thus the inductive windings 16, 17, 21, 22, 26 and 27, which constitute the primary windings of the transformer 12, are connected respectively through the electric valves 47, 48, 49, 50, 51 and 52 to one side of the direct current circuit 10. One terminal of each of the inductive windings 18, 19, 23, 24, 28 and 29, which comprise the secondary windings of the transformer 12, is connected to one side of the direct current circuit 11. The remaining terminals of these windings are connected, respectively, through the electric valves 53 to 58, inclusive, to the other side of the direct current circuit 11. Each of the tertiary windings 20, 25 and 30 is provided with an energy storage device or capacitor 59, 60 and 61, respectively, which is connected so as to be in parallel therewith or at least across a portion thereof, and these various tertiary windings are connected to form a closed circuit or delta connection. While each of the electric discharge paths 47 to 58, inclusive, has been shown as comprising a separate electric valve having an anode, a cathode and a control grid, it is to be understood that any of the electric valves well known in the art may be employed and that it is only necessary to provide a device having an anode and a control electrode or grid so that the electric discharge path between the anode and cathode may be controlled. It is, of course, to be understood that it is preferable to utilize electric valves of the type containing an ionizable medium. Obviously, of course, it will be apparent to those skilled in the art that a multi-anode, single cathode device could be utilized in place of the group of valves 47 to 52 and other multi-anode, single cathode devices could be utilized in place of the group of valves 53 to 58. The control or starting electrodes of the electric discharge paths 47 to 52 are energized from a suitable source of alternating current 62 through a primary winding 63 of a transformer, the secondary windings 64 of which are connected to the control electrodes of these valves. Suitable current limiting resistors may be included in the grid-cathode circuit as is customary practice in the art. If it is desired to transfer current only from the direct current circuit 10 to the direct current circuit 11, it will be apparent that the electric discharge paths 53 to 58 could be of the two-electrode type and that the grids disclosed are not essential to the operation of the system. However, the control electrodes or grids of the discharge devices 53 to 58 have been shown as being connected through current limiting resistors and a biasing source 65 to the cathodes of these devices. If it is desirable to provide a system wherein energy may be transferred in either direction, the biasing source 65 may be eliminated and a transformer similar to the windings 63 and 64 may be substituted so as to control these discharge paths whenever energy is to be transferred from the circuit 11 to the circuit 10.

In operation the magnetic core structures 31 and 32, together with their windings and associated capacitors, operate as static sources for supplying commutating potentials to the electric discharge paths 47 to 52. Thus it is possible for these electric discharge paths to break up the direct current received from the circuit 10 into rectangular current impulses. The electric discharge paths or valves 53 to 58 merely operate as the customary rectifiers. During the operation of the transformer 12, the capacitors 59, 60 and 61 store up energy which during a subsequent cycle discharges into the windings 20, 25 and 30, thereby supplying a magnetizing current for the transformer so that it is possible to efficiently utilize rectangular current impulses in this system. Further operation of the system is believed to become apparent to those skilled in the art by examination of the curves disclosed in Fig. 5. Thus the curves shown at $a$ in Fig. 5 show the shape and phase relation of the currents transmitted by the valves 47 to 52. The current impulses of these various valves are denoted in this figure by subscript reference characters corresponding to these valves. At $b$ in Fig. 5, these curves represent the currents transmitted by the electric valves 53 to 58. The curves disclosed at $c$ represent the theoretical voltages appearing across the various windings of the transformer legs 13, 14 and 15. The actual voltages appearing across the windings of these various transformer legs, however, would appear as shown, for example, at $e$ since the tertiary circuit supplies a magnetizing current to the transformer. The voltage and current relations supplied by the capacitors of the magnetic core structures 31 and 32 are disclosed at $d$. The capacitor current is denoted by the symbol I and the voltage by the symbol E.

Figure 6:
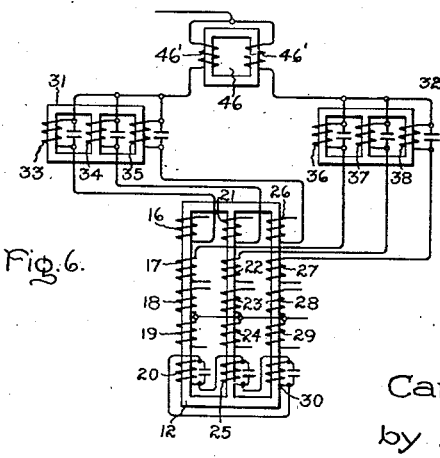

The arrangement of the various inductive windings disclosed in Fig. 1 is shown in greater detail in Fig. 6 wherein the core structures and inductive windings bear similar reference characters.

In the modification disclosed in Fig. 2 the elements which operate in the same manner as corresponding elements of Fig. 1 have been given like reference characters. This system is distinguished from Fig. 1 in that a single magnetic core structure 67 having inductive windings 68, 69 and 70 with associated capacitors 71, 72 and 73 operates to supply the commutating potentials for the various valves 47 to 52. In this arrangement the commutating device operates at twice the frequency of the system disclosed in Fig. 1, and hence the curves shown in Fig. 5 at $d$ would be similar but contracted to cover only a period of 180 degrees whereupon the same curves would be repeated for the following 180 degrees.

The arrangement in Fig. 3 utilizes a magnetic core structure 74 which is similar to the core structure 67 of Fig. 2, but each leg thereof is provided with an additional inductive winding. Each of the inductive windings is connected to a different one of the primary windings of the transformer 12. Thus the inductive winding 68' is connected to the transformer winding 16 and the inductive winding 75, which is on the same leg of the core structure as the inductive winding 68', is connected to the primary winding 17. Similarly, inductive windings 76 and 77 are connected respectively to primary windings 22 and 27. In this arrangement the energy storage circuits comprising the inductive windings 68', 69' and 70' and their associated capacitors 71', 72' and 73' operate at the same frequency as the corresponding energy storage circuits of the magnetic core structure 67. During one portion of the cycle of operation of the valves 47 and 48, the energy stored in this circuit supplies a commutating potential directly to the electric valve 47, whereas during the succeeding cycle of operation the commutating potential is supplied to the electric valve 48 by magnetic coupling between the windings 68' and 75.

In the arrangement disclosed in Fig. 4 the magnetic core structure 78 which constitutes the source of commutating potential for the various electric valves is shown as a three-legged core structure wherein each leg is provided with four windings. One winding on each leg is provided with an associated capacitor so as to form an energy storage circuit. Thus the windings 79, 80 and 81 are each provided with capacitors 82, 83 and 84, respectively, so as to form energy storage circuits. These windings are connected to the primary windings 16, 21 and 26 respectively. One of the other windings, such as 85, 86 and 87, is connected respectively to windings 17, 22 and 27. The windings 88, 89 and 90 are connected respectively to one terminal of each of the windings 18', 23' and 28'. The windings 91, 92 and 93 are connected respectively to the windings 19', 24' and 29'. In this arrangement the energy storage circuits operate at twice the frequency of the circuits disclosed in Fig. 3. It is believed that it will be apparent to those skilled in the art that the operation of the system shown in Fig. 4 is similar to the system disclosed in the other figures. The arrangement disclosed in this figure, however, has the advantage that because of the fact that each of the windings of the main transformer 12 is directly connected to one of the windings of the magnetic core structure 87, it is possible to transfer energy readily between the direct current circuits 10 and 11 in either direction.

While this invention has been shown and described in connection with certain specific embodiments it will, of course, be understood that it is not to be limited thereto, since it is apparent that the principles herein disclosed are susceptible of numerous other applications, and modifications may be made in the circuit arrangements and in the instrumentalities employed without departing from the spirit and scope of this invention as set forth in the appended claims.

What I claim as new and desire to secure by Letters Patent of the United States is,—

1. An electric valve converting system for transferring energy between two constant potential direct current circuits comprising a transformer having three groups of windings, electric discharge apparatus each interconnecting one of said groups of windings with a different direct current circuit, energy storage means connected with said third group of windings, means for controlling the conductivity of said electric discharge apparatus, and means for supplying commutating potentials to said system.

2. An electric valve converting system for transferring energy between two constant potential circuits comprising a transformer having a group of primary windings associated with one of said circuits, a group of secondary windings associated with the other of said circuits and a group of tertiary windings, energy storage devices connected with said tertiary windings, electric discharge apparatus providing an electric discharge path for each of said primary and said secondary windings, means for controlling the conductivity of said electric discharge apparatus, and means connected between one of said direct current circuits and one group of transformer windings for supplying commutating potentials to said system.

3. An electric valve converting system for transferring energy between constant potential direct current circuits comprising a transformer having groups of windings each associated with a different one of said circuits, electric discharge apparatus providing an electric discharge path for each of said windings, means associated with said groups of windings for supplying magnetizing currents to said transformer, static means connected between one of said circuits and said transformer for supplying commutating potentials to said system, and means for controlling the conductivities of at least the discharge paths associated with one of said groups of windings.

4. An electric valve converting system for transferring energy between two constant potential direct current circuits comprising a transformer having a plurality of groups of primary, secondary, and tertiary windings, electric discharge apparatus providing an electric discharge path for each winding of said primary and secondary groups of windings, energy storage means for each of said tertiary windings, means interconnecting said teritary windings and energy storage means to form a closed circuit, means interconnecting said secondary windings and associated electric discharge paths with one of said direct current circuits, means for each of said primary groups of windings for supplying commutating potentials thereto, means interconnecting said primary groups of windings and the associated means for supplying commutating potentials thereto to the other of said direct current circuits, and means for controlling the conductivities of at least the electric discharge paths associated with one of said direct current circuits.

5. An electric valve converting system for transferring energy between two constant potential direct current circuits comprising a transformer having three groups of windings, energy storage means for each of the windings of one of said groups, means interconnecting said energy storage means and said windings to form a closed circuit, means including a plurality of electric discharge paths for interconnecting one of said groups of windings with one of said direct current circuits, means including a plurality of controlled electric discharge paths for interconnecting the remaining windings with one side of the other of said direct current circuits, means for supplying commutating potentials to said transformer, means interconnecting said last mentioned means and said group of transformer windings effectively in series across said last mentioned direct current circuit, and means for controlling the conductivities of said last mentioned electric discharge paths.

6. An electric valve converting system for transferring energy between two constant potential direct current circuits comprising a transformer having primary, secondary and tertiary windings, each of said primary and secondary windings being provided with an intermediate tap, a capacitor connected to each of said tertiary windings, means connecting said capacitors and tertiary windings into a closed circuit, means for connecting the intermediate taps of said secondary windings to one side of one of said direct current circuits, and means comprising a plurality of electric discharge paths interconnecting the remaining terminals of said secondary windings with the other side of said direct current circuit, means connected between one side of the other of said direct current circuits and the intermediate tap of the primary windings for supplying commutating potentials to said apparatus, means comprising a plurality of controlled electric discharge paths interconnecting the remaining terminals of said primary windings with the other side of said direct current circuit, and means for controlling the conductivities of said electric discharge paths.

7. An electric valve converting system for transferring energy between two constant potential direct current circuits comprising an $n$-legged transformer having two groups of primary windings, a group of secondary windings each provided with an intermediate tap and a group of tertiary windings, an $n$-legged core structure provided with two windings on each leg thereof, a capacitor for one of the windings on each of the legs thereof, inductive means interconnecting the windings of said core structure with one side of said direct current circuit, means interconnecting one of the windings of each said $n$-legged structure with one of the primary windings of said $n$-legged transformer, means interconnecting the other winding of said $n$-legged structure with the remaining primary windings of said $n$-legged transformer, a plurality of controlled electric discharge paths for interconnecting the remaining terminals of said primary windings with the other side of said direct current circuit, means interconnecting the intermediate tap of said secondary windings with one side of the other of said direct current circuits and a plurality of electric discharge paths interconnecting the remaining terminals of said secondary windings with the other side of said direct current circuit, a capacitor associated with each of said tertiary windings, means interconnecting said tertiary windings to form a closed circuit, and means for controlling the conductivites of said electric discharge paths.

8. An electric valve converting system for transferring energy between two constant potential direct current circuits comprising an $n$-legged transformer having two primary windings, two secondary windings and a tertiary winding on each leg thereof, an $n$-legged core structure having two primary and two secondary windings on each leg thereof, a capacitor for each leg of said structure, each capacitor being associated with one of the primary windings to form an energy storage circuit, an inductive winding having an intermediate point connected to one side of one of said direct current circuits, means connecting one terminal of said inductive winding with one terminal of one of the primary windings on each leg of said structure, means connecting the other terminal of said inductive winding with one terminal of each of the remaining primary windings of said structure, means for connecting each of the remaining terminals of the primary windings of said structure with a different primary winding of said transformer, a plurality of controlled electric discharge paths interconnecting the remaining terminals of the primary windings of said transformer with the other side of said direct current circuit, means connecting one terminal of each of the secondary windings of said device with one side of the other of said direct current circuits, means connecting the remaining terminals of each of the secondary windings of said structure with one terminal of a different one of said secondary windings of said transformer, a plurality of electric discharge paths interconnecting the remaining terminals of the secondary windings of said transformer with the other side of said second direct current circuit, a capacitor for each of said tertiary windings of said transformer arranged to form energy storage circuits, means interconnecting all of said tertiary windings and associated capacitors in a closed circuit, and means for controlling the conductivities of said electric discharge paths.

CARL C. HERSKIND.